US009292867B2

(12) United States Patent
Patel et al.

(10) Patent No.: US 9,292,867 B2
(45) Date of Patent: Mar. 22, 2016

(54) ELECTRONIC RECEIPT SYSTEM

(75) Inventors: Jay Pravin Patel, Washington, DC (US);
Tomas E Diaz, Windermere, FL (US);
Sachin Chand Jaitly, New York, NY (US)

(73) Assignee: FLEXRECEIPTS INC., Windermere, FL (US)

( * ) Notice: Subject to any disclaimer, the term of this patent is extended or adjusted under 35 U.S.C. 154(b) by 232 days.

(21) Appl. No.: 13/251,480

(22) Filed: Oct. 3, 2011

(65) Prior Publication Data
US 2012/0084391 A1 Apr. 5, 2012

Related U.S. Application Data

(60) Provisional application No. 61/404,447, filed on Oct. 4, 2010.

(51) Int. Cl.
G06Q 30/06 (2012.01)
G06Q 20/04 (2012.01)

(52) U.S. Cl.
CPC ............ *G06Q 30/06* (2013.01); *G06Q 20/0453* (2013.01)

(58) Field of Classification Search
USPC ......................................................... 709/217
See application file for complete search history.

(56) References Cited

U.S. PATENT DOCUMENTS

| 2003/0055733 | A1* | 3/2003 | Marshall et al. | 705/24 |
| 2003/0126020 | A1* | 7/2003 | Smith et al. | 705/21 |
| 2005/0043992 | A1* | 2/2005 | Cohagan et al. | 705/14 |
| 2008/0081662 | A1* | 4/2008 | Strandell et al. | 455/557 |
| 2008/0207203 | A1* | 8/2008 | Arthur et al. | 455/435.1 |
| 2008/0208744 | A1* | 8/2008 | Arthur et al. | 705/41 |
| 2009/0271265 | A1* | 10/2009 | Lay et al. | 705/14.38 |
| 2009/0271322 | A1* | 10/2009 | Lay et al. | 705/75 |
| 2010/0100434 | A1* | 4/2010 | Sock | 705/14.38 |
| 2010/0332265 | A1* | 12/2010 | Smith | 705/4 |
| 2011/0137803 | A1* | 6/2011 | Willins | 705/67 |

* cited by examiner

Primary Examiner — Natisha Cox
(74) Attorney, Agent, or Firm — Allen, Dyer, Doppelt, Milbrath & Gilchrist, P.A.

(57) ABSTRACT

A method includes receiving, at a user identification module of an electronic receipt system in electronic communication with a point of sale terminal, a user identifier transmitted from a mobile communication device to a near-field communication enabled communication device associated with the point of sale terminal. The method also includes verifying, by a validation module of the electronic receipt system, an enrollment status of the user identifier; and based on results of the verifying, transmitting, by a transfer module of the electronic receipt system, the user identifier and data characterizing an electronic receipt to a receipt storage module of the electronic receipt system.

8 Claims, 2 Drawing Sheets

ELECTRONIC RECEIPT SYSTEM

CROSS-REFERENCE TO RELATED APPLICATIONS

This application claims priority to U.S. Provisional Application Ser. No. 61/404,447, filed Oct. 4, 2010, and entitled "Mobile NFC User ID Capture for Electronic Receipts," the contents of which are incorporated herein by reference.

BACKGROUND

Paper receipts are used by most merchants at their point-of-sale (POS) or checkout to confirm the purchase of goods or services and are later used by consumers to perform returns, exchanges, rebates, and claims. However, the thermal paper requirements for providing paper receipts pose serious environmental threats, including deforestation and high levels of water utilization. Furthermore, in today's digital environment, having to physically store a paper receipt is both inconvenient and inefficient for both the consumer and retailer. To reduce the use of paper receipts while still maintaining the ability to provide consumers with confirmation for the purchase of goods or services, electronic receipt systems have been introduced to the market.

In one such electronic receipt system, when a consumer arrives at a POS terminal to purchase a good or service, the consumer may request an electronic receipt or a paper receipt. If an electronic receipt is selected, the electronic receipt system validates the consumer's identity. To this end, the consumer and/or a salesperson performs a particular action at the POS terminal, such as swiping a magnetic card (e.g., credit card, debit card, member card), scanning a barcode, or manually entering a specific series of predefined characters (e.g., telephone number, e-mail address). Once the consumer's identity is validated, an electronic receipt is generated for storage and/or processing in association with the consumer's account, for instance, in an online database.

In another electronic receipt system, near-field communication (NFC) can be used to transfer an electronic receipt between an NFC communications device at the POS and an NFC-enabled mobile phone. Alternatively, a camera on a consumer's mobile phone is used to capture a photograph of a digital receipt. In both of these cases, the electronic receipt is then stored in a memory on the mobile phone.

NFC is a standards-based short-range wireless connectivity technology that allows for simple, fast, and secure data transfer between electronic devices. NFC is based on existing international standards recognized by the ISO/IEC (International Organization for Standardization/International Electrotechnical Commission), ETSI (European Telecommunication Standards Institute), and ECMA (European association for standardizing information and communication systems). NFC is compatible with contactless infrastructure that is already in place in diverse locations throughout the world. With the advent of NFC-integrated mobile devices such as mobile phones, it is possible to entirely eliminate the need for an individual to carry a magnetic card or scannable barcode card, or to remember and manually input a series of characters, for a variety of retail and other situations. Instead, an NFC-enabled mobile device can function as a contactless card in conjunction with a contactless card reader for identifying an individual at a POS.

SUMMARY

In a general aspect, a method includes receiving, at a user identification module of an electronic receipt system in electronic communication with a point of sale terminal, a user identifier transmitted from a mobile communication device to a near-field communication enabled communication device associated with the point of sale terminal. The method also includes verifying, by a validation module of the electronic receipt system, an enrollment status of the user identifier; and based on results of the verifying, transmitting, by a transfer module of the electronic receipt system, the user identifier and data characterizing an electronic receipt to a receipt storage module of the electronic receipt system.

Embodiments may include one or more of the following.

The method further includes storing the data characterizing the electronic receipt in association with the user identifier in a database associated with the receipt storage module.

Verifying the enrollment status of the user identifier includes receiving a communication from the user identification module including the user identifier; determining the enrollment status of the user identifier; and transmitting a communication to the user identification module indicative of the enrollment status of the user identifier.

The method further includes, based on the status of the user identifier, enabling enrollment of the user identifier in the electronic receipt system. Enabling enrollment of the user identifier includes generating a temporary account in the electronic receipt system associated with the user identifier.

Transmitting the user identifier and the electronic receipt includes generating a message including the user identifier and data associated with the electronic receipt; and transmitting the message to the receipt storage module. The method, wherein the message is at least one of an XML message, a text format message, or an image. Data associated with the electronic receipt include at least one of an identifier of a product, an identifier of a merchant, a date, a purchase price, and a receipt number.

In another general aspect, an electronic receipt system includes a user identification module in electronic communication with a point of sale terminal, the user identification module configured to receive a user identifier transmitted from a mobile communication device to a near-field communication enabled communication device associated with the point of sale terminal. The electronic receipt system also includes a validation module configured to verify an enrollment status of the user identifier in the electronic receipt system; a transfer module configured to transmit the user identifier and an electronic receipt based on the enrollment status of the user identifier; and a receipt storage module configured to store the user identifier and the electronic receipt in a database.

Embodiments may include one or more of the following.

The user identification module and the transfer module are co-located in a first location and the validation module and the receipt storage module are co-located in a second location.

The electronic receipt system further includes a service interface configured to receive data from the transfer module. The user identification module and the transfer module are co-located in a first location and the validation module, the receipt storage module, and the service interface are co-located in a second location.

The electronic receipt system further includes a web interface configured to enable a user of the electronic receipt system to access the electronic receipt stored in the receipt storage module. The user identification module and the transfer module are co-located in a first location and the validation module, the receipt storage module, and the web interface are co-located in a second location.

The systems and methods described herein have a number of advantages. In particular, transmitting a customer identifier via a near-field communication equipped mobile phone is efficient and convenient and eliminates the possibility of the customer losing an identification card or forgetting a username or password.

Other features and advantages of the invention are apparent from the following description and from the claims.

DETAILED DESCRIPTION

1 Electronic Receipt Generation

Figure 1:
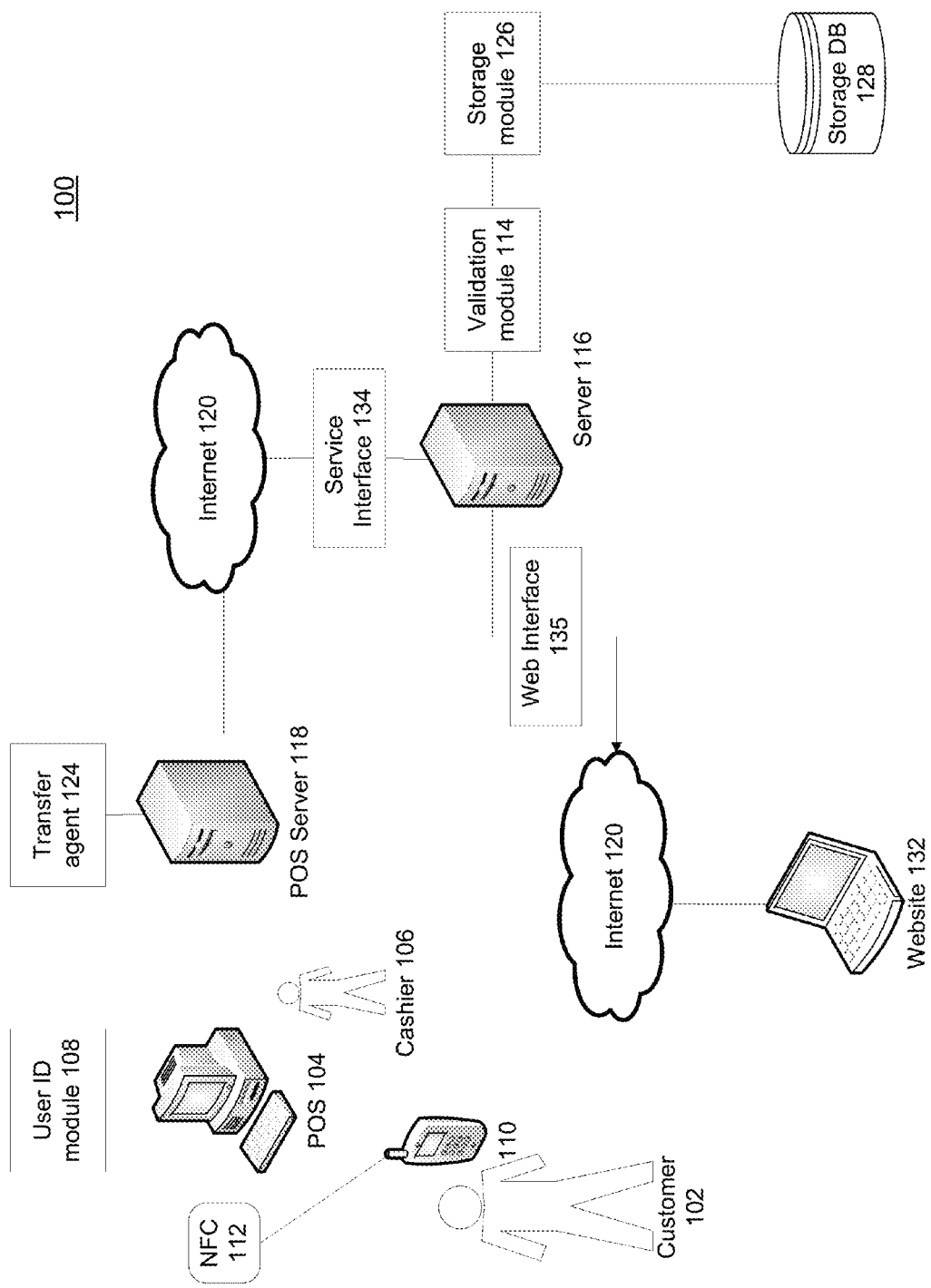
FIG. 1 is a block diagram of an electronic receipt system.

Referring to FIG. 1, an electronic receipt system 100 generates an electronic receipt for a customer's retail transaction and stores the electronic receipt in association with the customer's account in the electronic receipt system.

Figure 2:
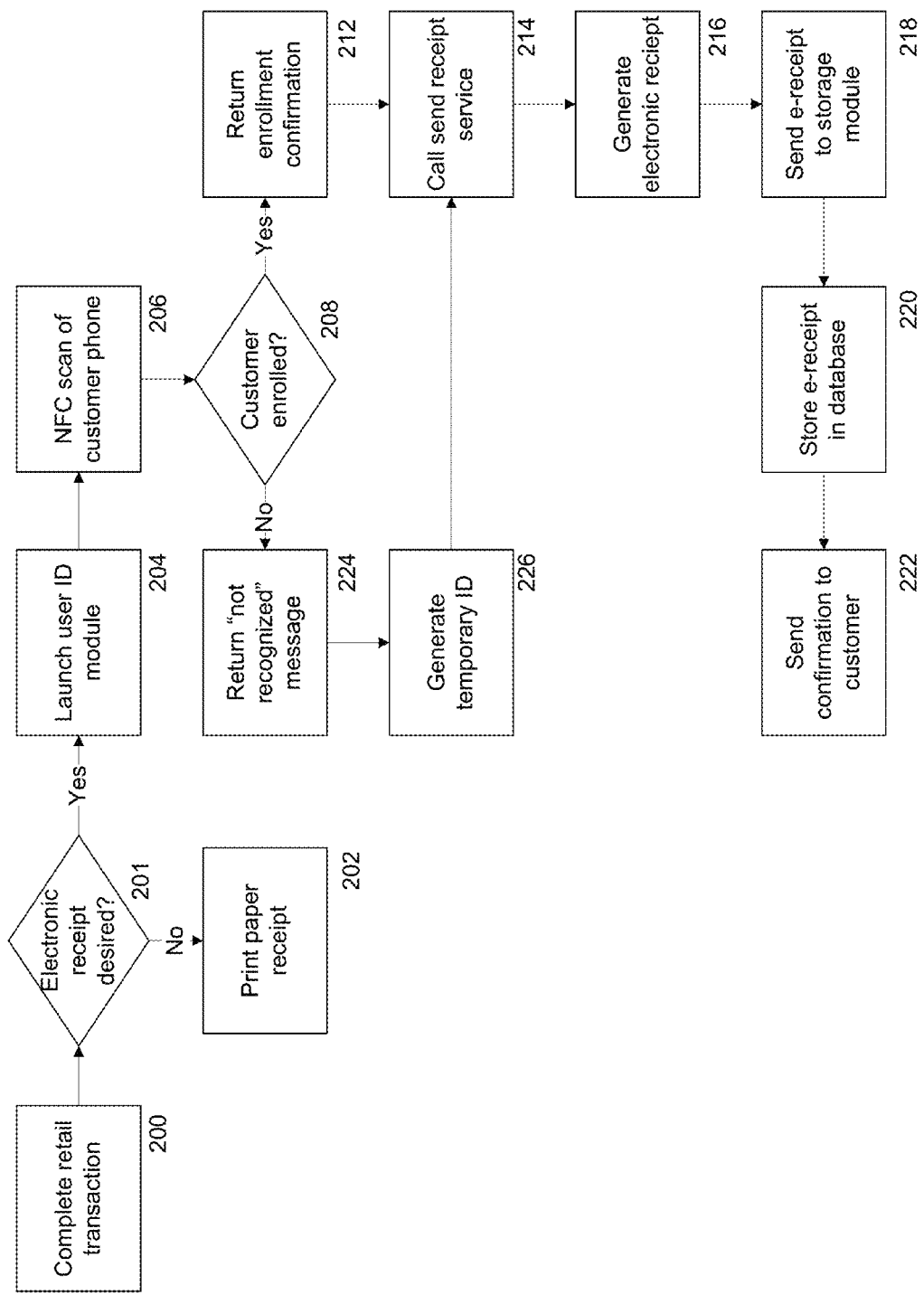
FIG. 2 is a flow chart of a transaction at a point-of-sale (POS).

Referring also to FIG. 2, when a customer 102 performs a transaction (e.g., a purchase of goods or services) at a merchant's point-of-sale (POS) terminal 104 (step 200), the customer is asked whether an electronic receipt is desired (step 201). In some instances, a cashier 106 asks customer 102 whether he prefers a paper receipt or an electronic receipt. In other instances, the customer is asked via a display on a display screen at the POS terminal. If customer 102 does not want an electronic receipt, a paper receipt is printed for the transaction (step 202).

If customer 102 desires an electronic receipt, a user identification (ID) module 108 is launched at POS terminal 104 (step 204). In some cases, user ID module 108 is integrated with the POS operating system and thus is automatically launched when the customer indicates that an electronic receipt is preferred. In other cases, user ID module 108 is launched manually, e.g., by cashier 106 pressing an appropriate button on a terminal hosting the user ID module.

Once user ID module 108 is launched, customer 102 positions a near-field communication (NFC)-enabled mobile communication device (e.g., a mobile phone) 110 proximal to a contactless NFC-enabled reader 112 at POS terminal 104 to identify himself to the electronic receipt system (step 206). A customer identifier is read from mobile phone 110 by NFC reader and transferred to user ID module 108. In some cases, NFC reader 112 is a peripheral device in electronic communication with POS terminal 104; in other cases, NFC reader 112 is integrated into the POS terminal. In general, NFC reader 112 can be any type of contactless NFC-enabled reader capable of receiving information communicated by any type of NFC-enabled device.

To validate an enrollment status of the customer identifier in the electronic receipt system (step 208), user ID module 108 transmits the customer identifier to a service interface 134 of electronic receipt system 100. Service interface 134 passes the incoming data to a validation module 114 hosted on a server 116 of the electronic receipt system 100. Server 116 is typically located physically distant from POS terminal 104; communication between user ID module 108 and validation module 114 occurs via a POS server 118 connected to the Internet 120.

Validation module 114 accesses a storage database 128 that includes a list of customer identifiers enrolled in electronic receipt system 100. In some embodiments, the customer identifier itself is a username in the electronic receipt system. In other embodiments, storage database 128 includes a mapping between the customer identifier and a username or another account identifier.

If the customer identifier is verified as being enrolled in electronic receipt system 100, validation module 114 returns an enrollment confirmation message to user ID module 108 (step 212). If the customer identifier is not the username, the enrollment confirmation message may also include the username or other account identifier.

Upon receipt of the enrollment confirmation message, user ID module 108 instructs POS terminal 104 to call a "send receipt" service operated by a transfer agent 124 (step 214). The "send receipt" service causes a message to be generated including the electronic receipt for the retail transaction, in a format such as an XML message, a text format message, or an image, by a transfer agent 124 hosted on POS server 118 (step 216). The electronic receipt includes the customer identifier and/or username or other identifier and transaction details such as, e.g., an identifier of a product, such as a brand and model number; product details, such as a category or subcategory, industry, or department; an identifier of a merchant; a transaction date; a purchase price; a receipt number; and the merchant's terms and conditions or return policy). The electronic receipt is securely sent via service interface 134 to the validation module 114 which parses and validates the receipt data. Once validated, the electronic receipt is then directed to a storage module 126 hosted on server 116 (step 218). Storage module 126 stores the transaction details in the customer's account in storage database 128 (step 220). In some cases, such as if desired by the customer, a storage confirmation message can be sent as an email or Short Message Service (SMS) message to the customer's email account or mobile phone alerting the customer of the success or failure of the data transfer (step 222). Once the electronic receipt is stored in database 128, the receipt can be accessed via a website 132.

If the customer identifier is not present in the storage database 122 (step 208), validation module 114 returns a message to user ID module 108 indicating that the customer identifier is not recognized (step 224). Upon receipt of this message, user ID module 108 generates a unique temporary random identifier for the customer (step 226) and transmits the temporary identifier to the customer. The temporary identifier can be communicated in any of a number of ways, such as, for instance, printing the temporary identifier on a paper receipt, emailing the temporary identifier or sending a text message including the temporary identifier to the customer (provided the customer is willing to provide his email address or phone number), transmitting the temporary identifier by NFC to mobile phone 110, or displaying the temporary identifier on a display screen at POS terminal 104. POS terminal then calls the "send receipt" service (step 214) operated by transfer agent 124 to generate an electronic receipt including the temporary identifier and transaction details (step 216). The electronic receipt is sent to storage module 126 (step 218), where the transaction details are stored in a temporary account associated with the temporary identifier (step 220). At a later time, the customer can then access the electronic receipt system 100 via website 132 to enroll in the system, create an account, and access the receipt.

In the embodiment described above, transfer agent 124 generates and sends electronic receipts in real time, i.e., after each retail transaction. In an alternative embodiment, each electronic receipt is generated in real time but receipts are sent to storage module 126 in batches, for instance at periodic intervals or after a designated number of retail transactions have taken place.

In another alternative embodiment, the customer is not explicitly asked whether an electronic receipt is desired. Rather, to indicate that an electronic receipt is desired, the customer scans a magnetic swipe card, keycard, mobile Card-Star, or other medium including a barcode associated with the electronic receipt system. Alternatively, the customer positions his mobile communication device proximal to reader 112, causing user ID module 108 to be launched and causing the customer identifier to be read from the mobile communication device.

In general, the user ID module 108 and the transfer agent 124, as well as other components described below, are designed to conform to existing Associate Retail Technology Standards (ARTS) standards in order to facilitate integration into the variety of existing POS hardware systems at retail sites.

In some embodiments, server 116 is a single server. In other instances, server 116 represents a group of multiple servers, each server serving a particular element of the electronic receipt system (e.g., an applications server, a web server, and/or a database server).

In the embodiment described above, a single storage database 128 stores all user data and electronic receipt data. In other embodiments, multiple databases are used. For instance, a first database may store user data and a second database may store electronic receipt data.

2 Web and Mobile Applications

Website 132 provides users of the electronic receipt system with access to their account in the electronic receipt system via a web interface 135. When a user accesses the website for the first time, the user is prompted to establish an account, including selecting a username and password for use when logging onto website 132. As used herein, the term "website" may also refer to a mobile/tablet application with similar functionality. Once enrolled, users can edit account information and add personal information such as gender, location, shopping preferences, credit card numbers, and loyalty card numbers. The user is also prompted to link his mobile phone to the account, e.g., by downloading a mobile application including the user's customer identifier, so that the customer identifier will be able to be transferred to the POS during a retail transaction. In some cases the username is the same as the customer identifier; in other cases, the username and the customer identifier are different.

Users can view and manipulate electronic receipts via website 132, including categorizing the receipts into various folders (pre-existing or user-defined), exporting receipts (in formats such as .csv, .xls, .pdf), and printing receipts. Flexible search options including search filters (based on parameters such as date, retailer, or industry), category search, and sorting are available.

The electronic receipt system tracks each user's purchases at the stock-keeping unit (SKU level, enabling the system to identify information such as price paid, date of purchase, quantity of items purchased, and coupons used. Using this information, optionally in combination with personal information such as gender or location, the electronic receipt system can identify and display promotions and coupons that may be of interest to a particular user. In addition, the electronic receipt system facilitates the searching of rebates available for products a user has purchased and provides a mechanism for submitting rebates via website 132. The electronic receipt system will also track return periods, display a product return countdown for each returnable product, and send reminders when a product return period is about to expire.

A merchant portal of website 132 provides merchants with access to all electronic receipts for their customers, enabling merchants to perform actions such as generating reports on purchases made by all electronic receipt customers.

A mobile application provides many of the functions available through website 132, including enrollment; viewing and searching of receipts; and display of promotions, rebates, and return periods. Using the mobile application, customers can view their electronic receipts in real time when a transaction is completed. In addition, the mobile application can display a receipt barcode on a customer's mobile phone; a retailer can scan the receipt barcode to retrieve and display receipt information on the retailer's POS terminal. In some embodiments, the mobile application displays a customer identifier barcode which can be scanned at a POS terminal to transmit the customer identifier, thus allowing customers to receive electronic receipts from merchants without NFC readers.

3 Implementation

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

In some cases, the modules of the electronic receipt system are implemented as web services using transfer protocols such as SOAP (Simple Object Access Protocol) over HTTP (Hypertext Transfer Protocol), JMS (Java Message Service), or other standard protocols.

It is to be understood that the foregoing description is intended to illustrate and not to limit the scope of the invention, which is defined by the scope of the appended claims. Other embodiments are within the scope of the following claims.

What is claimed is:

1. A method of operating an electronic receipt system, the method comprising:
    receiving, at a server of the electronic receipt system and from a point-of-sale (POS) terminal, a user identifier transmitted from a mobile communication device via a near-field communication (NFC) device associated with the POS terminal;
    verifying, by a validation module of the server, an enrollment status of the user identifier received;
    when the enrollment status of the user identifier is not verified, generating at the server a temporary user identifier to define the user identifier, transmitting the temporary user identifier to the mobile communications device via the NFC device and the POS terminal, and providing a paper receipt with the temporary user identifier therein;
    receiving, from the POS terminal, an electronic receipt and passing one of the user identifier and the temporary user identifier, and the electronic receipt to a receipt storage module of the server; and
    receiving, from a user and via a user interaction interface of the server, a request including one of the user identifier and the temporary user identifier to access the electronic receipt.

2. The method of claim 1, further comprising storing the electronic receipt in association with one of the user identifier and the temporary user identifier in the receipt storage module.

3. The method of claim 1, wherein verifying the enrollment status of the user identifier includes:
    receiving a communication from the user identification module including the user identifier;
    determining the enrollment status of the user identifier; and
    transmitting a communication to the POS terminal indicative of the enrollment status of the user identifier.

4. The method of claim 1, further comprising based on the status of the user identifier, enabling enrollment of the user identifier in the electronic receipt system.

5. The method of claim 1, wherein transmitting the user identifier and the electronic receipt includes:
    generating a message including the user identifier and data associated with the electronic receipt; and
    transmitting the message to the receipt storage module.

6. The method of claim 5, wherein the message is at least one of an XML message, a text format message, or an image.

7. The method of claim 5, wherein data associated with the electronic receipt include at least one of an identifier of a product, an identifier of a merchant, a date, a purchase price, and a receipt number.

8. A method of operating an electronic receipt system, the method comprising:
    receiving, at a server of the electronic receipt system and from a point-of-sale (POS) terminal, a user identifier transmitted from a mobile communication device via a near-field communication (NEC) device associated with the POS terminal;
    verifying, by a validation module of the server, an enrollment status of the user identifier received;
    when the enrollment status of the user identifier is not verified, generating at the server a temporary user identifier to define the user identifier, transmitting the temporary user identifier to the mobile communications device via the NEC device and the POS terminal, and providing a paper receipt with the temporary user identifier therein;
    when the enrollment status of the user identifier is verified, generating at the POS terminal an electronic receipt, and transmitting the electronic receipt to the server;
    receiving, from the POS terminal, the electronic receipt and passing one of the user identifier and the temporary user identifier, and the electronic receipt to a receipt storage module of the server;
    receiving, from a user and via a user interaction web interface of the server, a request including one of the user identifier and the temporary user identifier to access the electronic receipt;
    permitting the user, via the user interaction web interface, to categorize and filter the electronic receipt and a plurality of additional electronic receipts associated with the user identifier;
    displaying at least one offer to the user, via the user interaction web interface, and based upon data in the electronic receipt and the plurality of additional electronic receipts; and
    permitting a merchant, via a merchant web interface, to access the electronic receipt and the plurality of additional electronic receipts for the user and at least one additional user.

* * * * *